Dec. 15, 1942.   A. RICKENMANN   2,305,390
GRINDING MACHINE
Filed Aug. 13, 1941   9 Sheets-Sheet 1
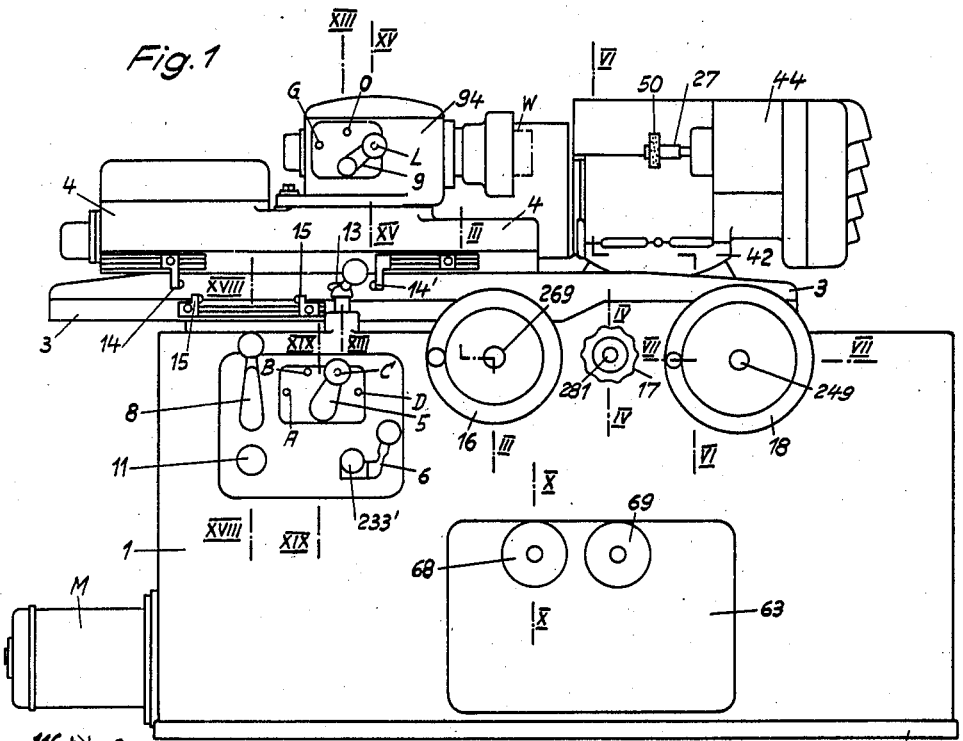
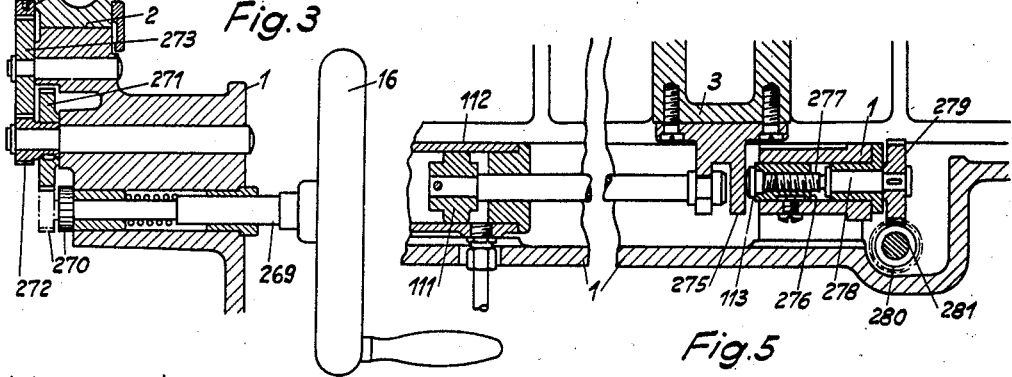
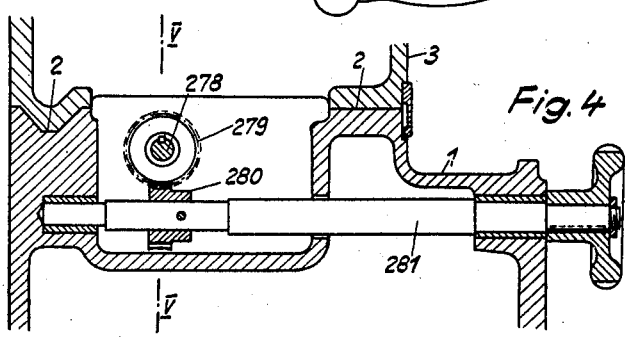
Inventor
Alfred Rickenmann
by
Singer, Ehlert, Stern and
Carlberg
Attorneys

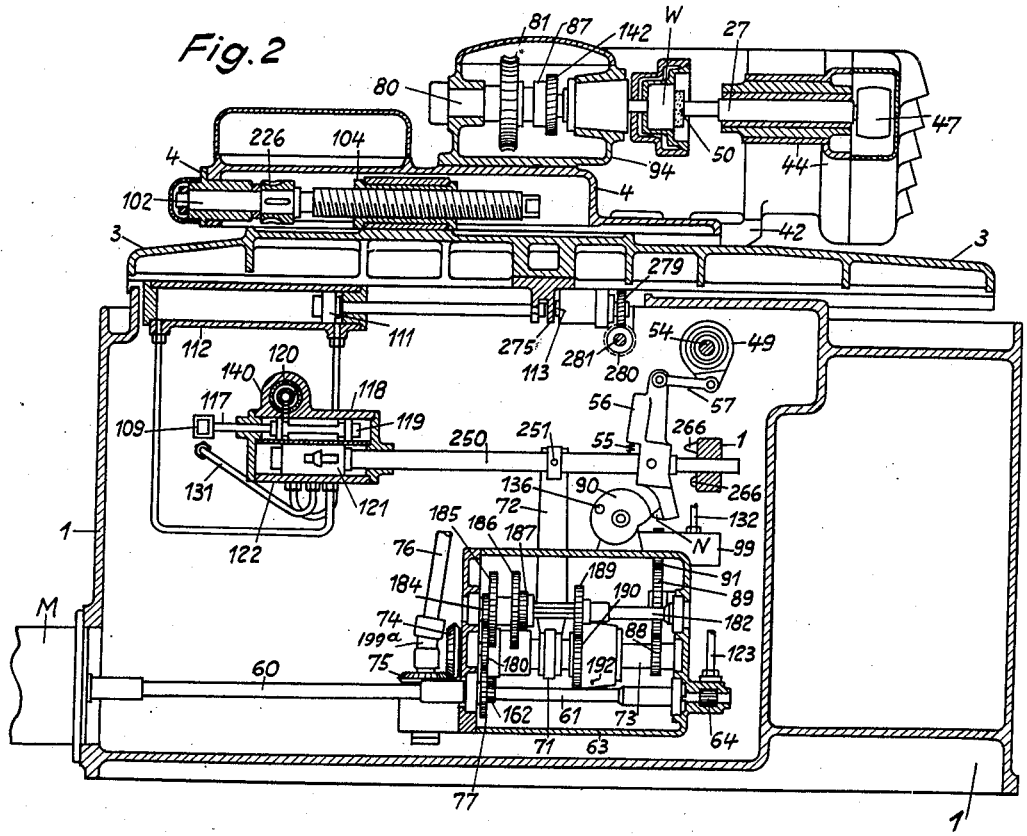
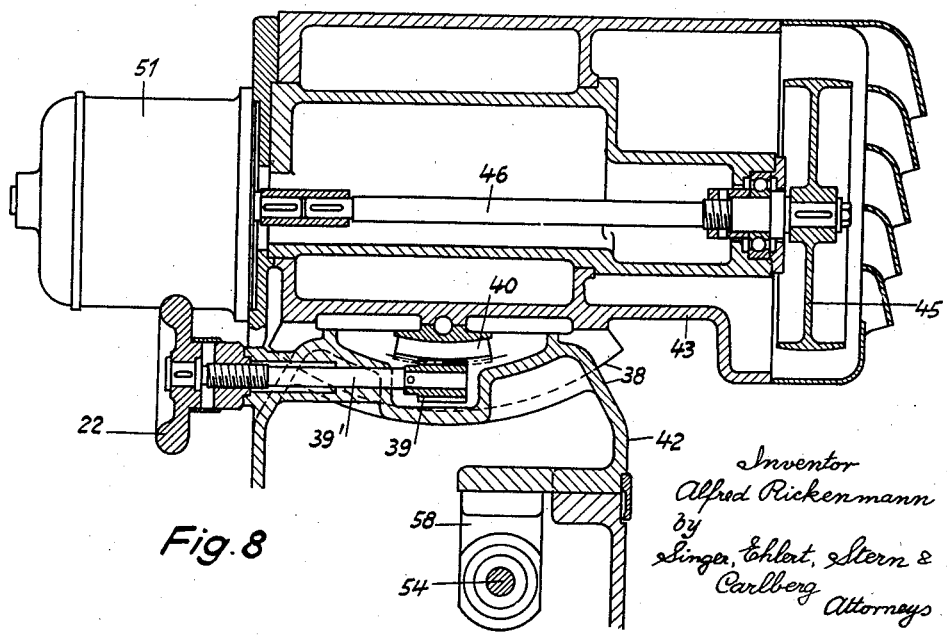

Dec. 15, 1942.  A. RICKENMANN  2,305,390
GRINDING MACHINE
Filed Aug. 13, 1941   9 Sheets-Sheet 3

Inventor
Alfred Rickenmann
by Singer, Ehlert, Stern & Carlberg
Attorneys

Dec. 15, 1942.　　　A. RICKENMANN　　　2,305,390
GRINDING MACHINE
Filed Aug. 13, 1941　　　9 Sheets-Sheet 5
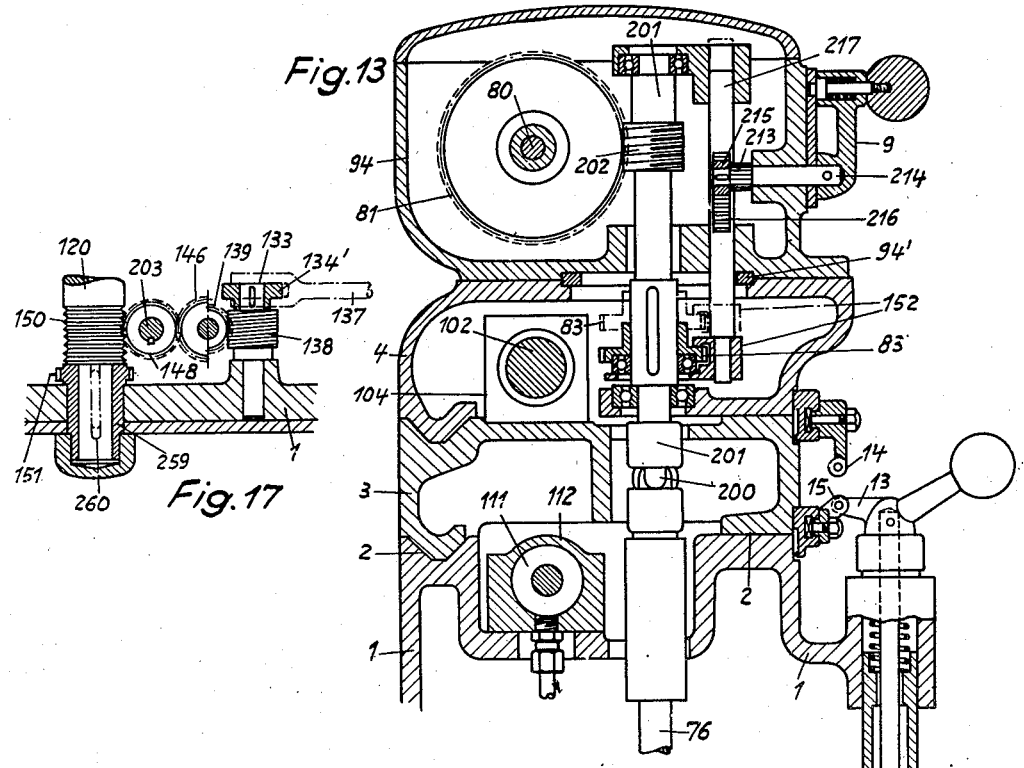
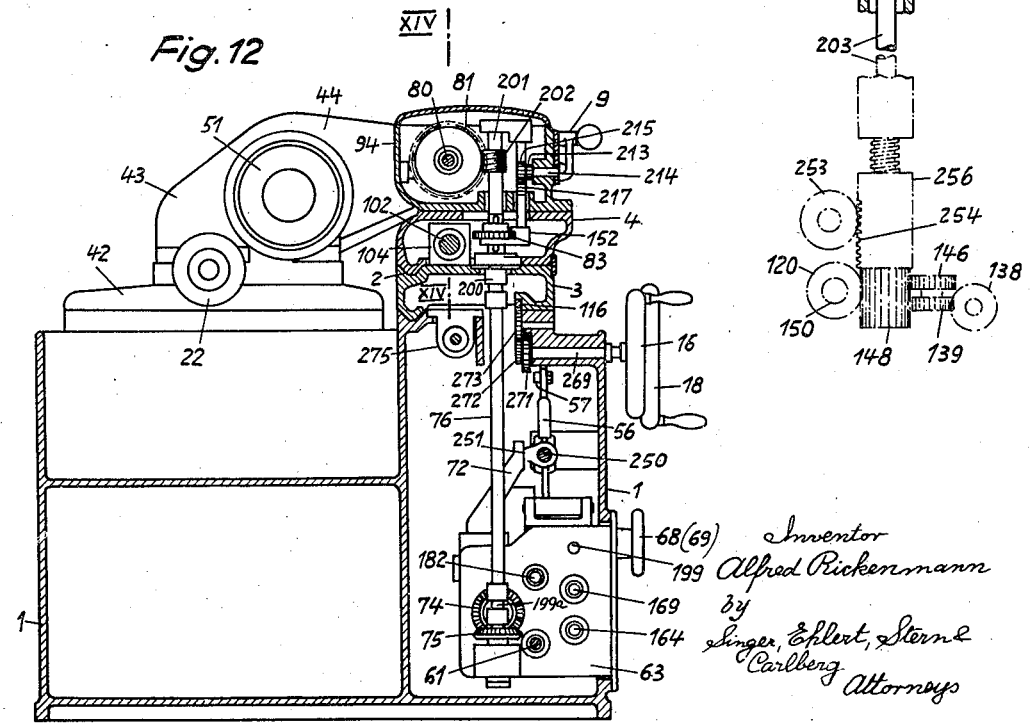

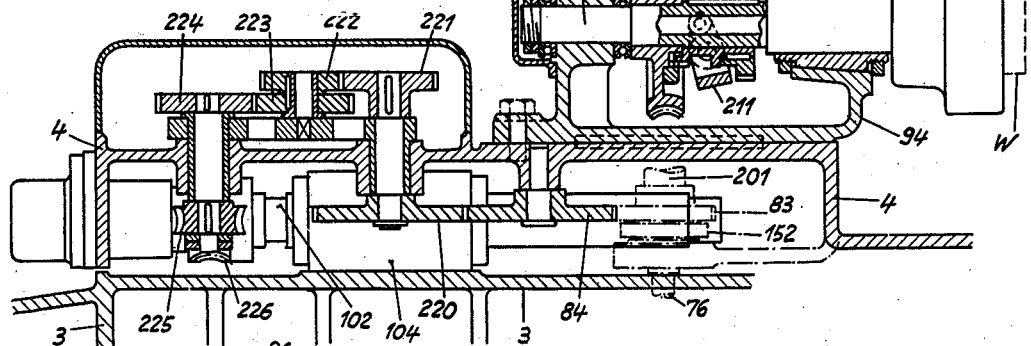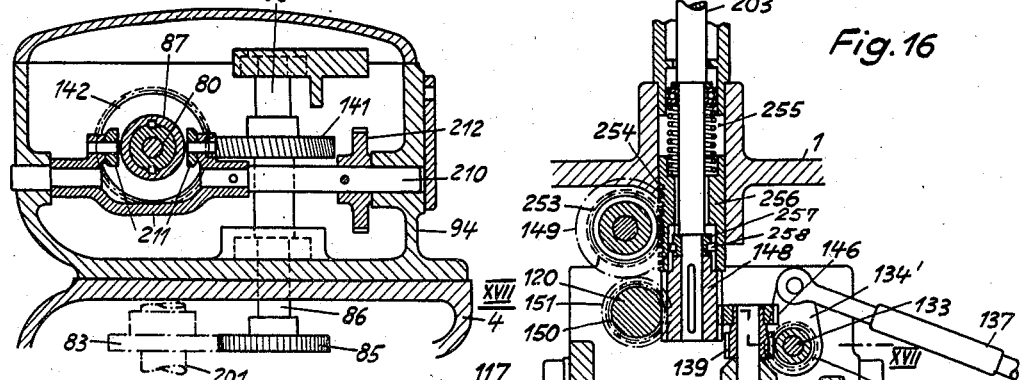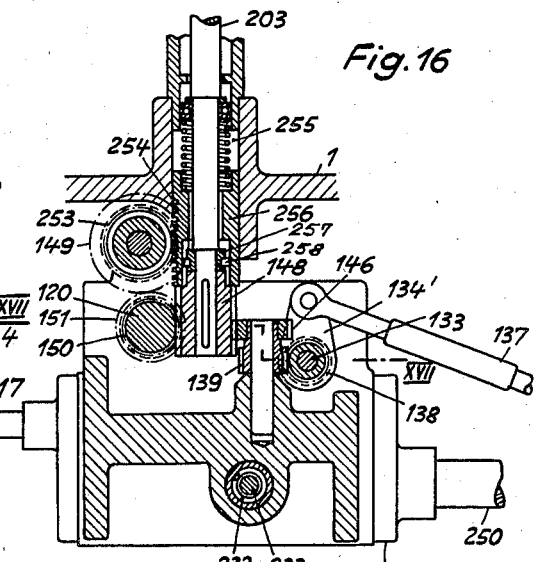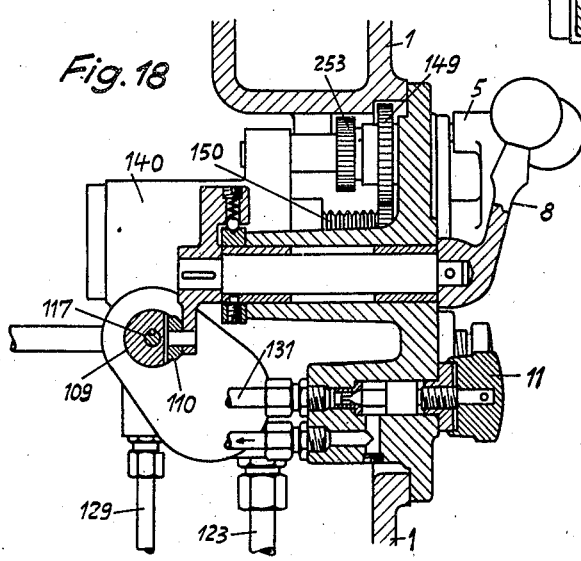

Dec. 15, 1942.  A. RICKENMANN  2,305,390
GRINDING MACHINE
Filed Aug. 13, 1941  9 Sheets-Sheet 7
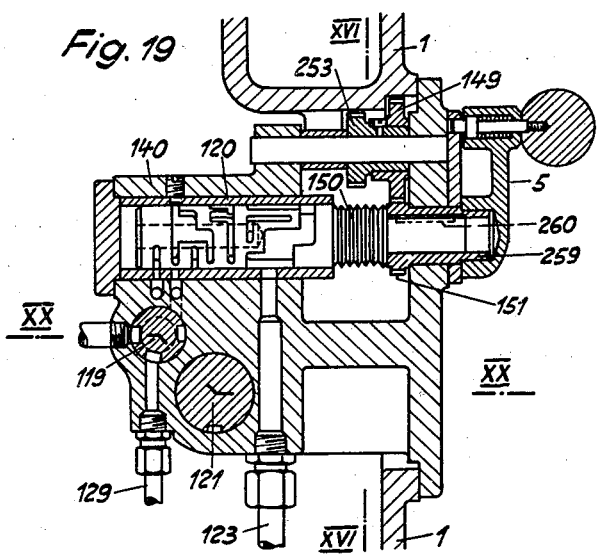
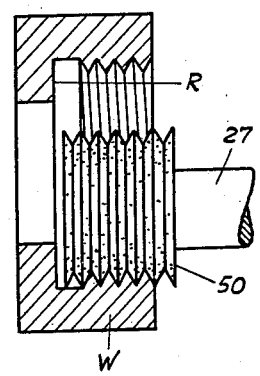
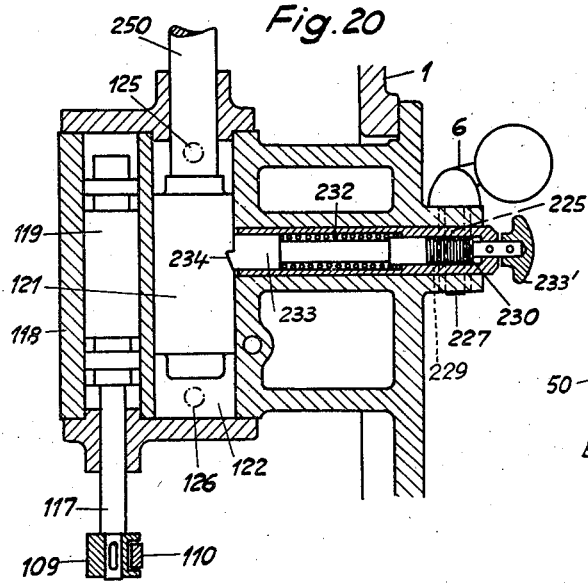
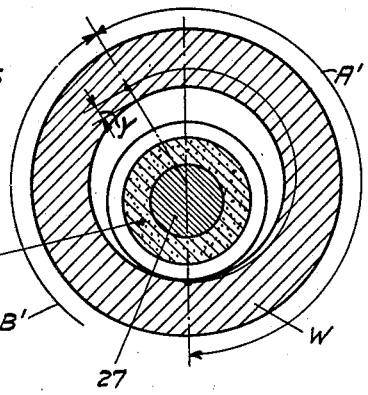
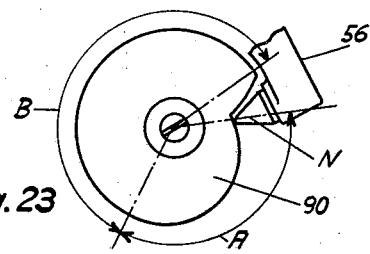

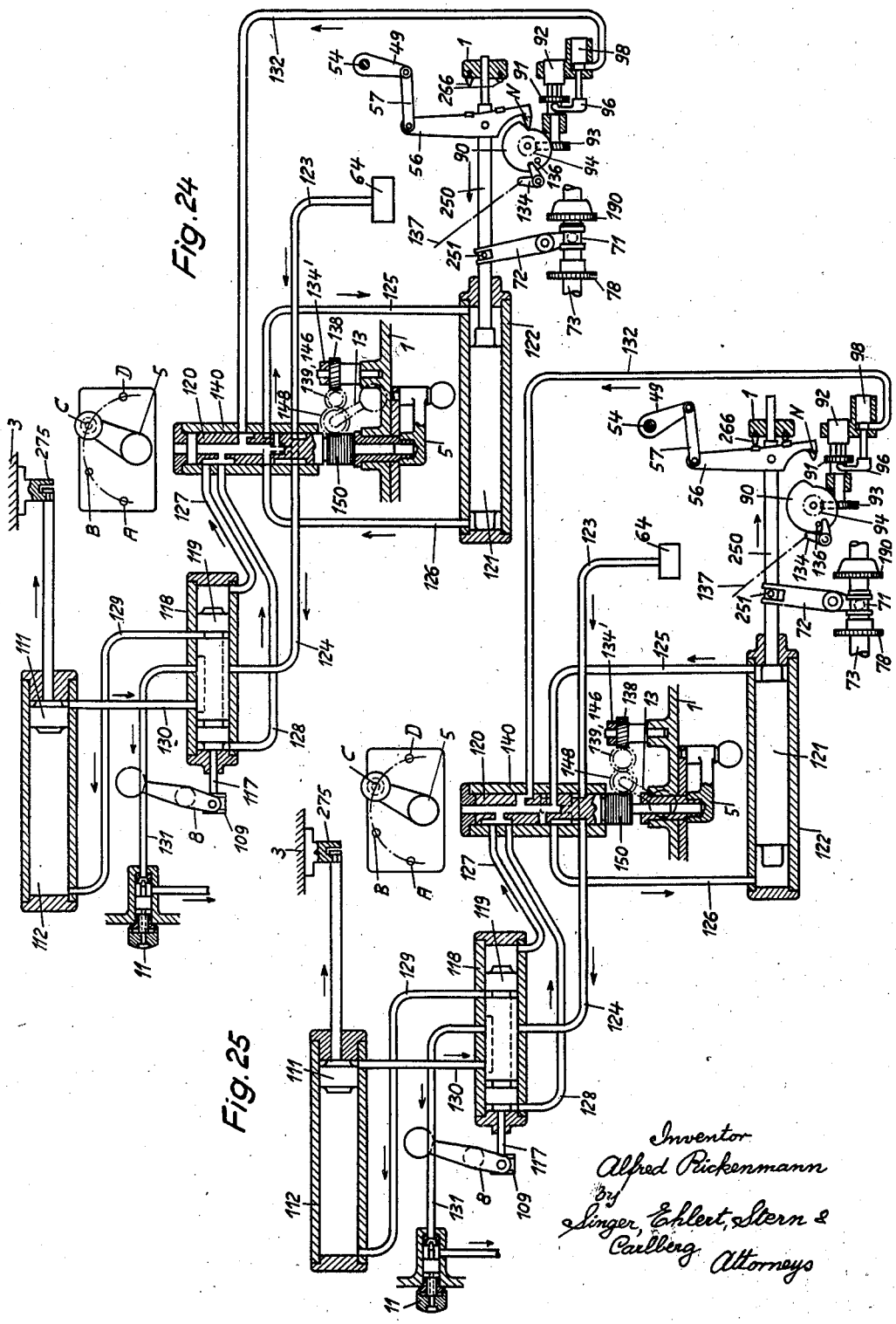

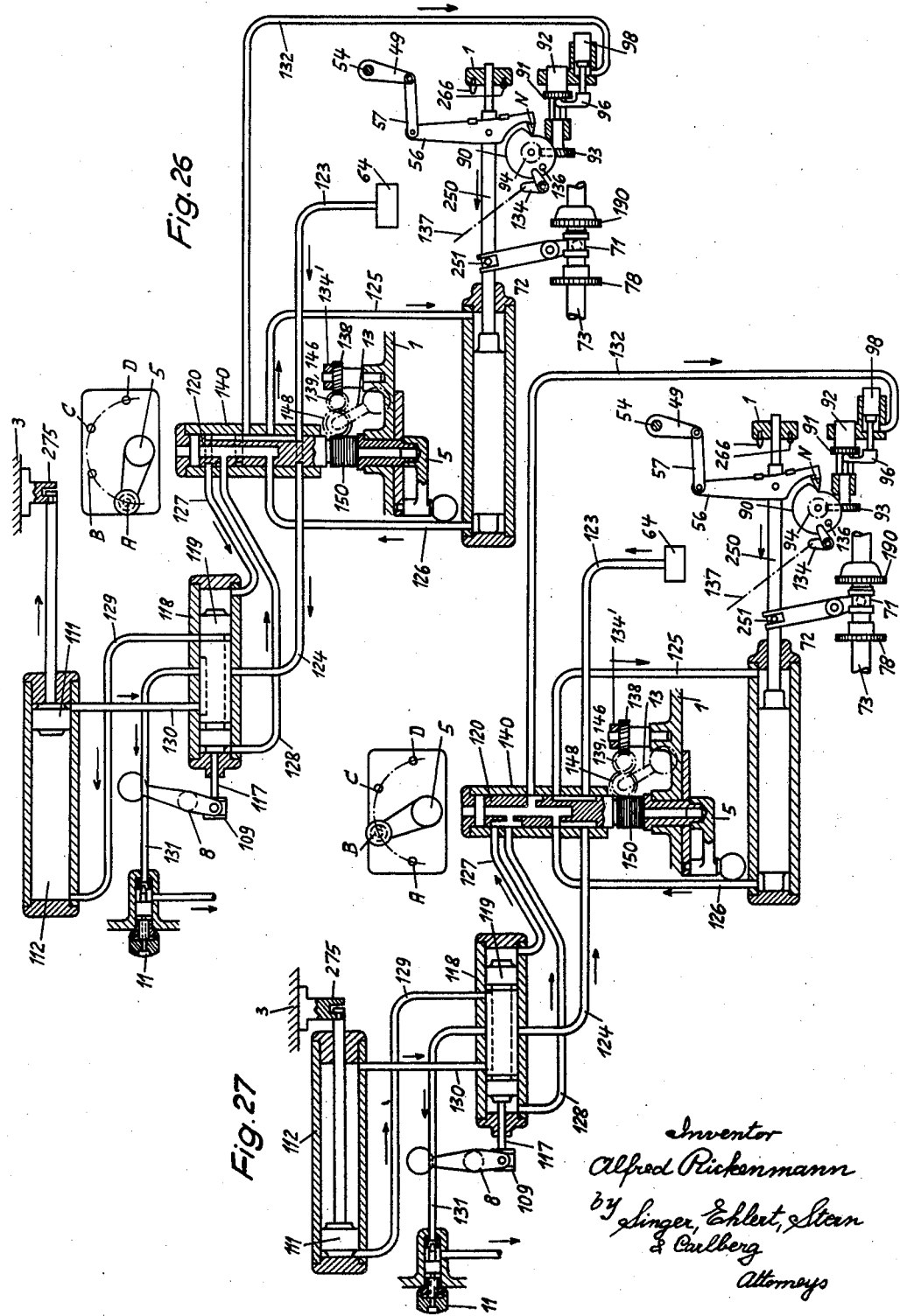

Patented Dec. 15, 1942

2,305,390

UNITED STATES PATENT OFFICE 2,305,390

GRINDING MACHINE

Alfred Rickenmann, Zurich, Switzerland, assignor to Reishauer-Werkzeuge Aktiengesellschaft, Zurich, Switzerland, a corporation of Switzerland Application August 13, 1941, Serial No. 406,738
In Switzerland July 29, 1940

5 Claims. (Cl. 51—95)

This invention relates to grinding machines and in particular to machines for grinding thread gauges and similar work with internal threads, with cylindrical surfaces and with radial faces.

The main object of the invention is to provide a grinding machine adapted to grind to the end in a single fixation and without requiring refixation of the work blank internal threads, cylindrical surfaces and radially disposed planes, such as the faces of shoulders and so on.

Another object of the invention is to provide a thread grinding machine in which the infeed movement of a multi-grooved disc is effected automatically during the rotary movement of the workpiece, the latter performing at least one complete revolution after the grinding disc has reached the full depth of thread, the workspindle and the grinding disc being returned automatically to their initial positions, while each time between the said return movements of the spindle and the grinding disc and the new operating sequence there is effected an additional feed of the grinding disc by hand.

A further object of the invention consists in the provision of a grinding machine of the said type by which all the grinding operations and not only the methods for producing screw threads may be performed either by hand or semi-automatically by simple yet efficient means.

The invention briefly described consists in the novel combination and arrangements of parts hereinafter fully described and particularly pointed out in the append claims.

In describing the invention in detail reference is to be had to the accompanying drawings forming part of this specification, wherein like numerals of reference indicate the corresponding parts throughout the several views thereof.

In the drawings:

Fig. 1 is a side elevation of the new grinding machine and

Fig. 2 a longitudinal sectional elevation thereof.

Figs. 3 and 4 are cross-sections on the lines III—III and IV—IV of Fig. 1.

Fig. 5 is a section taken on line V—V of Fig. 4.

Figs. 7 and 8 are sections on the lines VII—VII and VIII—VIII of Figs. 1 and 6 respectively.

Figs. 10 to 20 are respectively sections on the lines X—X of Fig. 1, XI—XI of Fig. 9, XII—XII of Fig. 2, XIII—XIII of Fig. 1, XIV—XIV of Fig. 12, XV—XV of Fig. 1, XVI—XVI of Fig. 19, XVII—XVII of Fig. 16, XVIII—XVIII of Fig. 1, XIX—XIX of Fig. 1, XX—XX of Fig. 1.

Figs. 21, 22 and 23 illustrate in a diagrammatical manner the working of the grinding disc and Figs. 24 to 27 show the hydraulic mechanism in different operative positions.

Figure 6:
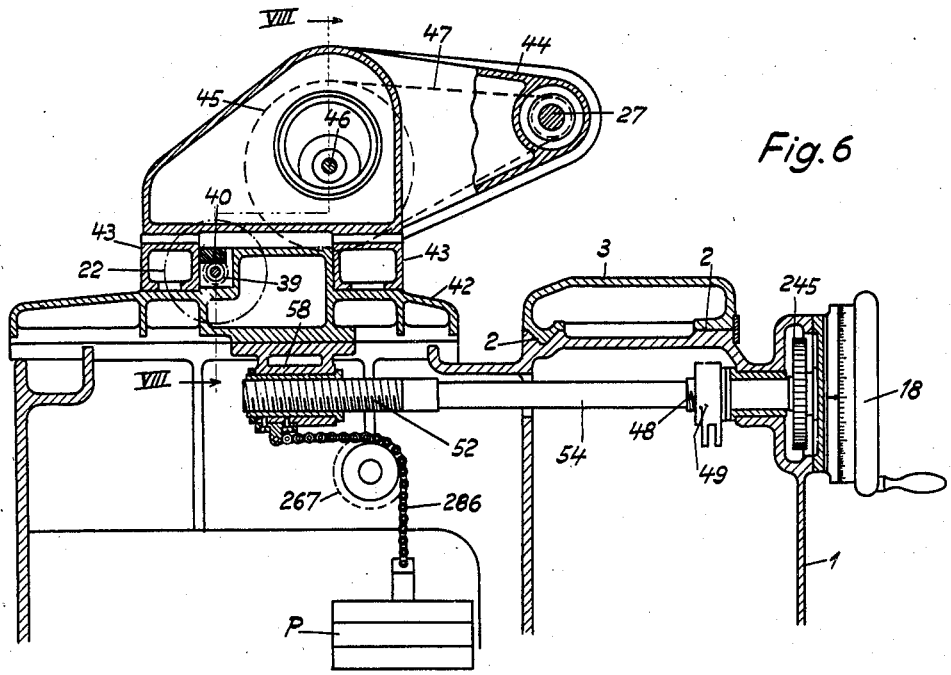
Fig. 6 is a section taken on line VI—VI of Fig. 1.

On the base 1 of the grinding machine a table 3 is slidably mounted on horizontal ways 2. The table 3 may be reciprocated by different means according to the work to be performed. The table 3 may be operated by hand by means of a hand wheel 16 (Figs. 1, 3, 12), fixed to a shaft 269, which is rotatably and axially displaceable mounted in the base 1. A spur wheel 270 keyed to shaft 269 may be brought in engagement with the spur wheel 271 which drives by an intermediate gear 272 a spur wheel 273 meshing with a rack 116 fast on table 3. The table 3 may be reciprocated further by fluid pressure mechanism comprising a hydraulic cylinder 112 (Figs. 2, 5, 24–27) with piston 111. The cylinder is fastened to base 1, the piston rod is attached to a lug 275 of table 3. The piston being actuated by pressure fluid, as will be described hereinafter, reciprocates the table 3. On the latter two dogs 15 are adjustably mounted cooperating with a controlling lever 13, which controls a distributing valve 140, 120 (Fig. 2) for the pressure liquid. The valve 140 reverses the stroke of the piston 111 and therewith of the table 3 as soon as one of the dogs 15 strikes against the lever 13 and turns the same. The lever 13 may be turned by hand with the same effect and for the same purpose. Further the table 3 may be brought to its initial position by turning a lever 8 (Figs. 1, 18, 26). Said lever 8 actuates a distributing valve 109, 117, 118, 119 (Fig. 2) of the said fluid pressure mechanism, which allows pressure fluid to enter the cylinder 112 and to press the piston 111 to the left, Fig. 2, as will be described hereinafter.

To position the table 3 in a working position an adjustable stop 113 (Figs. 2, 5) is provided projecting in the path of the lug 275 on table 3. The stop 113 is screwed into one end of a bushing 276, the other end of which is screwed onto the threaded end 277 of a shaft 278. The shaft 278 which is journalled in the base 1 may be rotated by the helical gears 279, 280 and shaft 281 (Figs. 1, 2, 4, 5) by a hand wheel 17 (Fig. 1).

On the table 3 a slide 4 is arranged running on ways of the table 3 parallel to the direction of travel of the latter. The slide 4 partakes on the movements of the table 3, the same fluid pressure mechanism is used to reciprocate the slide 4. Two dogs 14 adjustably mounted on the slide 4 co-operate with the said controlling lever 13 by which the valve piston 120 of said fluid pressure mechanism is set. The slide 4 may be moved independently of table 3 by means of a lead screw 102 (Figs. 2, 12, 13, 14) journalled in the slide 4 and engaging a nut 104 fastened to the table 3. By turning the lead screw 102 the slide 4 is moved on the table 3. To turn the screw 102 a change speed and reversing gearing is provided by which the said screw 102 and a shaft or work spindle 80 (Figs. 2, 13, 14, 15) carrying the work piece W may be rotated at a predetermined ratio. The shaft 80 is journalled in a spindlestock 94 mounted on the slide 4. The said spindlestock 94 may be turned about a vertical axis and may be fixed in any position on the slide 4 to allow the grinding of tapering surfaces.

On the base 1 a cross-slide 42 (Figs. 1, 2, 6, 7, 8, 12) is arranged adapted to be moved to and fro at a right angle to the way of the table 3 and slide 4 and therewith of the shaft 80 and the axis of rotation of the work piece W. The slide 42 carries the grinding disc 50 (Figs. 1, 2, 22) by a shaft 27 rotatably mounted in an arm 44 of a bearing block 43 (Figs. 6 and 8). In the latter a shaft 46 is journalled connected with one end to the shaft of an electro-motor 51, and carrying at the other end a belt pulley 45, driving by a belt 47 and a pulley the grinding disc shaft 27. The bearing block 43 is adjustably mounted on the slide 42 by means of segmental ways 38 (Fig. 8). The grinding disc shaft 27 may be brought in any angular position with reference to the axis of shaft 80 about which the working piece W rotates. If the grinding disc 50 has to cut screw threads in the work piece W, the plane of rotation of the disc 50 may be set into the proper angular position, according to the pitch of the screw threads to be produced. To set the bearing block 43 and therewith the shaft of the grinding disc 50 into the desired position a worm wheel segment 40 is fastened to the block 43 with which segment 40 (Figs. 6, 8), a worm 39 is in engagement. The worm 39 is keyed to a shaft journalled in the cross-slide 42 carrying a hand wheel 22. By turning the wheel 22 (Figs. 8, 12) the grinding disc 50 may be set in angular relation with reference to the work piece W.

Figure 7:
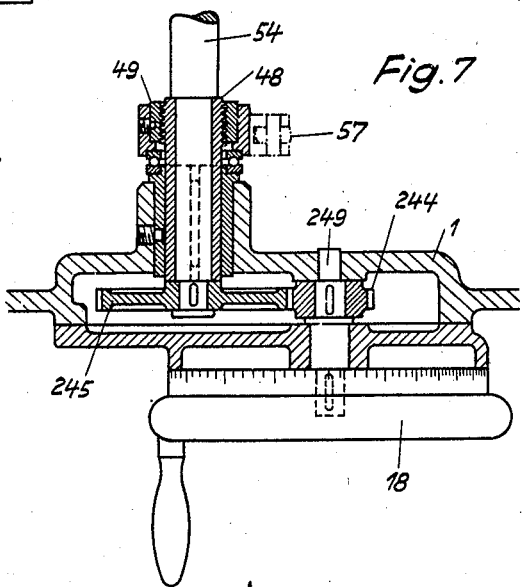

To move the cross-slide 42 to and fro and to produce the crossfeed of the grinding disc 50 a nut 58 (Figs. 6, 8) is fastened to slide 42. With said nut 58 the screw threaded portion 52 of a shaft 54 is in engagement, the latter being journalled in the base 1. On the outer end of the shaft 54 a spur wheel 245 (Figs. 6, 7) is keyed, which is driven by a pinion 244 on shaft 249, carrying the hand wheel 18 (Figs. 1, 6, 7). By turning wheel 18 the slide 42 and therewith the grinding disc 50 is radially moved with reference to the work piece W.

On the shaft 54 (Figs. 6, 7) an externally screwthreaded sleeve 48 is mounted on which a nut 49 is arranged. If the nut 49 is rotated the shaft 54 will be moved in axial direction. The nut 49 is actuated by means of an automatic device described hereinafter in detail by which the grinding disc 50 is advanced and withdrawn with reference to the work piece W in a predetermined manner. To take up any backlash of the shaft 54 a weight P (Fig. 6) fixed to a chain 286 running over the pulley 267 is attached to the nut 58 on the cross slide 42.

Figure 10:
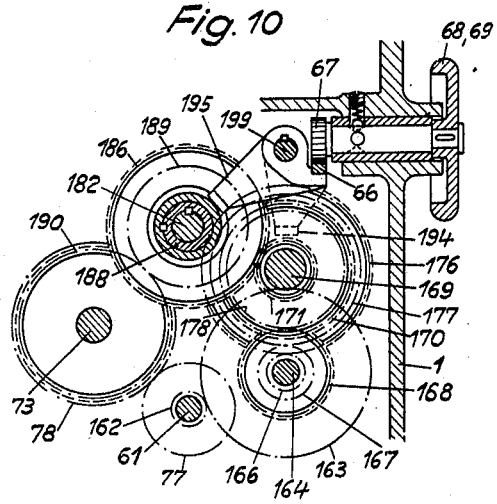

All the movements of the grinding disc 50 and of the workpiece W necessary for carrying out the work may be effected by hand or by an automatic pressure fluid mechanism in the following manner:

On the base 1 an electro-motor M is mounted, the shaft 60 of which is coupled with a shaft 61 journalled in the gear box 63. On the shaft 61 (Figs. 2, 9, 10), a gear 77 is keyed, and a pinion 162 on the shaft 61 drives by means of a spur wheel 163 an intermediate shaft 164. On the latter four gears 165, 166, 167 and 168 are secured. With said gears the spur wheels 175, 176, 177 and 178 respectively may be selectively brought in engagement, the last said set of four gears being mounted on a sleeve 174 slidably mounted on a key 173 of a shaft 169. On another sleeve 188 which is slidably mounted on a shaft 182 there are keyed the spur wheels 184, 185, 186, 187 adapted to be brought selectively in engagement with the gears 160, 172, 171 and 170 respectively, which are also mounted on the shaft 169. The sleeves 174 and 188 are each operated by a fork 194 and 195 respectively, which are slidably mounted on a shaft 199. Each fork is provided with a rack 66 and with each rack meshes a pinion 67. The pinions 67 are journalled in the side wall of case 1, and may be turned by hand by a knob 68 and 69 (Figs. 1 and 9) respectively.

The spur wheel 77 on shaft 61 meshes with a spur wheel 78 attached to a clutch member 191 rotatably mounted on a shaft 73. A second clutch member 192 is loosely mounted on the same shaft 73, and between the members 191, 192 a male clutch member 71 is arranged sliding on keys and transmitting the rotations of either member 191 or 192 to the shaft 73. With a spur wheel 190 attached to the clutch member 192 the spurwheel 189 on the shaft 182 is in engagement. By selectively positioning the sets of gears 184 to 187 and 175 to 178 the speed of the shaft 73 may be varied within wide limits. The male clutch part 71 is shifted by a lever 72, which is actuated by the dogs 14 and 15 and the pressure fluid mechanism.

The shaft 73 drives a vertical shaft 76 (Figs. 9, 12, 13) by means of the bevel gears 74, 75 and an universal joint 199a. By means of another universal joint 200 (Figs. 12, 13), said shaft 76 rotates a vertical shaft 201, rotatably mounted in the slide 4 and in the spindlestock 94. The shaft 201 drives by means of a worm 202 a worm wheel 81 loosely mounted on the hollow shaft 80 carrying the work piece W (Figs. 2, 14). The axis of the shaft 201 is in alignment with the axis about which the headstock 94 may be rotatably adjusted on its bearing 94[1] (Fig. 13). On a key of the shaft 80 a clutch member 87 (Figs. 2, 14) is slidably mounted adapted to positively connected the worm wheel 81 with the work spindle 80.

The clutch 87 is operated by a fork 211 (Figs. 14, 15) mounted on a shaft 210 which traverses the headstock 94 of the slide 4. On the shaft 210 of the fork 211 a spurwheel 212 is fastened meshing with a pinion 213 (Figs. 12, 13) keyed on a shaft 214 journalled in a wall of the headstock 94. On the shaft 214 a hand lever 9 (Figs. 1, 13) is fastened by means of which the clutch 87 may be thrown in and out of engagement with the worm wheel 81. On the clutch member 87 a helical gear 142 is fastened meshing with a helical gear 141 (Figs. 2, 15). The latter is mounted on a vertical shaft 86 journalled in the head stock 94. On the lower end of the shaft 86 a spur wheel 85 is keyed with which the spur wheel 83

(Figs. 12, 13, 14, 15) may be brought in engagement. The wheel 83 is slidably mounted on the shaft 201; it may be shifted thereon by a fork 152 (Figs. 12, 13) attached to a bar 217, slidably mounted in the head stock 94. The bar 217 is provided with a rack 216 with which the pinion 215 keyed to shaft 214 is in engagement. By turning the hand lever 9 not only the clutch member 87, but also the gear 83 is displaced. The wheel 85 will be automatically thrown out of gear with the gear 83, if the worm wheel 81 is being coupled with the shaft 80 by the clutch member 87 and vice-versa.

The wheel 83 may be set by the lever 9 to drive the lead-screw 102 (Figs. 2, 14) and to shift therewith the slide 4 with the head stock 94 and work spindle 80 relatively to the table 3 and to the grinding disc 50. For this purpose the spur wheel 83 is set by lever 9 to mesh with the gear 84, which drives by a train of change speed gears 220, 221, 222, 223, 224 (Figs. 2, 14) by means of the worm 225 the worm wheel 26 mounted on the screw threaded shaft 102 (Fig. 2). The coupling of the clutch member 87 with the worm wheel 81 by lever 9 will bring the gear 83 out of engagement with the gear 85. At the same time the said gear 83 will engage the spurwheel 84, driving the slide 4 by the gears 220 to 226 and the lead screw. The ratio of speed is about 1 to 16 if the shaft 80 is driven by the worm wheel 81 or by the gears 141, 142.

Figure 9:
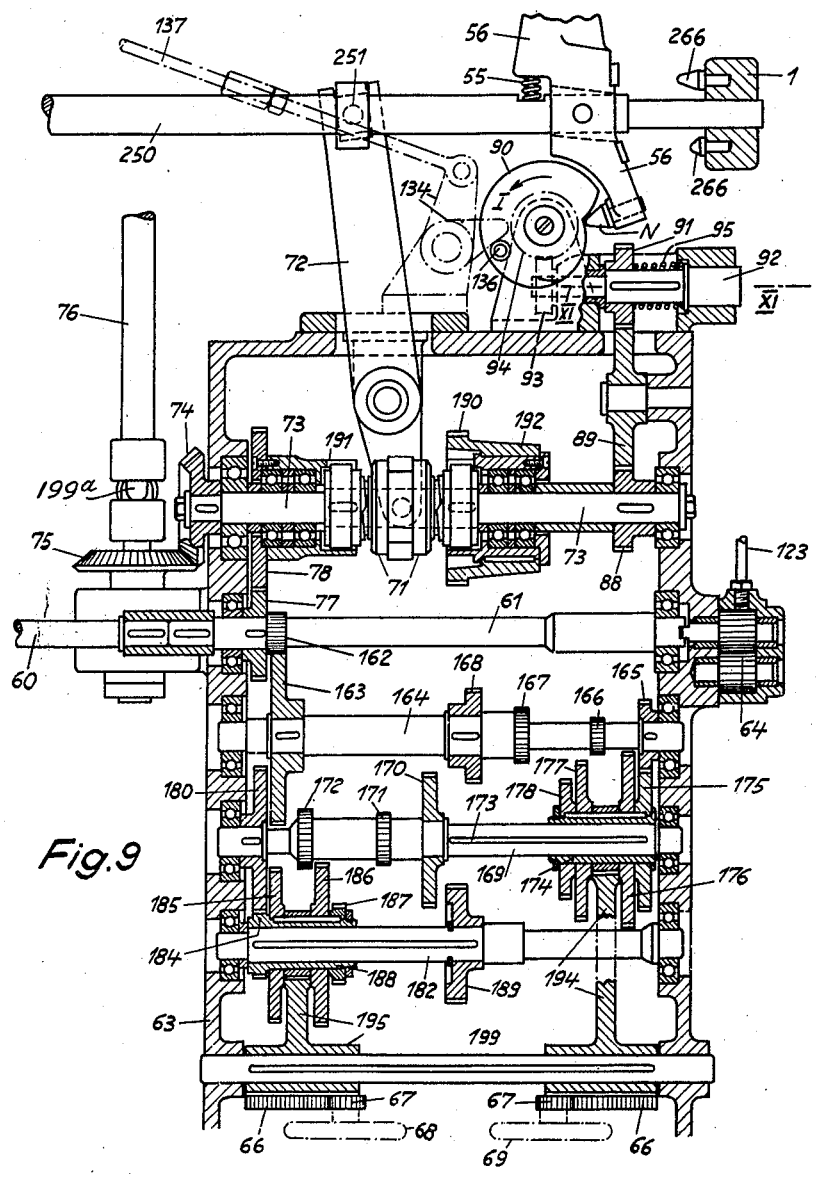
Fig. 9 shows the lay-out of the change speed and reversing gear in a diagrammatical manner.
Figure 11:
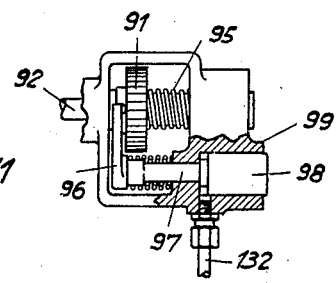

By operating the lever 72 the shafts 76 and 201 change the direction of rotation and therewith the direction of the travel of the slide 4 with work spindle 80 and workpiece W. To actuate the lever 72 automatically the fluid pressure device is made use of. The said device comprises a cylinder 122 and a piston 121 (Figs. 2, 19, 20) with piston rod 250. A cross pin 251 on said piston rod 250 engages a slot of the lever 72 (Fig. 9). The piston 121 moving to and fro reverses the clutch member 71 and therewith the direction of travel of the slide 4. The piston rod 250 furthermore operates a gearing to reciprocate the cross slide 42 to feed the grinding disc 50 to and from the workpiece W. On the piston rod 250 a double armed lever 56 (Figs. 2, 9) is rockingly mounted. The upper end of lever 56 is connected with the nut 49 (Figs. 2, 6, 7) by means of a link 57. The reciprocating piston rod 250 oscillates the nut 49 about the shaft 54 moving thereby shaft 54 in axial direction and the slide 42 accordingly. The infeed of the disc 50 is controlled by cam 90 (Figs. 2, 9, 23 to 27). A part only of the periphery of the cam 90 is formed concentrically with its axis of rotation. The lever 56 presses with a nose N against the periphery of said cam 90 owing to the pressure existing in the cylinder 122 operating the piston rod 250 and lever 56 is swung out the nose N forming the pivot of the lever 56. The latter actuates link 57 and causes the infeed of the grinding disc 50. In the automatic grinding of screw threads the cam 90 is rotated and effects a slow infeed movement of the grinding disc into the workpiece W, in any predetermined measure with respect to the revolutions made by the workpiece W. The cam 90 is driven from the shaft 73 by means of the gears 88, 89, 91 and the helical gears 93 and 94 (Fig. 9). A coiled spring 55 placed between the lever 56 and the piston rod 250 keeps the nose N of the lever 56 in contact with the cam 90. The spur wheel 91 is slidably mounted on a shaft 92; it may be shifted against the action of a spring 95 (Figs. 9, 11) by means of a fork 96. The fork is fastened to a rod 97 of a piston 98, sliding in a cylinder 99. The latter is connected by a pipe 132 (Figs. 2, 11, 24–27) to the valve 140 (Figs. 2, 19, 24–27) of the pressure fluid mechanism. The said valve 140 is actuated by a pin 136 projecting sidewards on the cam 90. The pin 136 strikes upon rotation of cam 90 against one arm of a double armed lever 134, the other arm of which being connected by a link rod 137 to an arm 134¹ mounted on a shaft 133 (Fig. 17). With the arm 134¹ a helical gear 38 is rigidly connected which oscillates by intermediate gears 139, 146, 148 the rotary piston 120 of the controlling device 140.

The valve devices 120, 140 govern the action of the piston 111, actuating the table 3; and of the piston 121 respectively actuating the reversing and change speed gear lever 72; and also of the piston 98 (Fig. 11) which brings the cam 90 in and out of action. Oil is fed under pressure to the valve 140 by a pump 64 (Fig. 9) through a pipe 123. In the pipe 131 a hand operated throttling valve 11 is arranged (Figs. 1, 24 to 27), by means of which the flow of the liquid in the pipe 131 and therewith the speed of table 3 may be regulated.

The piston 119 of an auxiliary valve 118 may be actuated by a lever 8 (Figs. 1, 18, 20). One arm 110 of the shaft carrying lever 8 engages a guide piece 109 fastened on the rod 117 of the piston 119. If the piston 119 is moved to the left (Fig. 2) the pressure fluid enters on the right hand side of the piston 111. The latter then draws the table 3 to the left (Fig. 2).

The fluid pressure mechanism comprises the valve piston 120 which is rotatably and axially displaceable mounted in the cylinder 140. The valve piston 120 may be set by the controlling lever 13 co-operating with the dogs 14 and 15 of the slide 4 and the table 3 respectively. The lever 13 (Figs. 13, 16) is fixed on the shaft 203, which is rotatably mounted in the base 1. On shaft 203 at the lower end thereof a toothed gear 148 is rigidly fastened meshing with a circular rack 150 formed on the valve piston 120 (Figs. 16, 17). By turning the lever 13 the valve piston 120 will be moved in axial direction in the cylinder 140 and by doing so will interconnect ports and pipes leading pressure fluid to the said cylinders 118, 122 in a manner as described later on. The shaft 203 (Fig. 16) carrying the lever 13, is axially displaceable and rotatably mounted in a sleeve 256 which in turn is slidably mounted in a bore 255 of the base 1. The shaft 203 may be displaced in its axial direction. For this purpose radial pins 258 in the sleeve 256 engage a circular groove in a bushing 257 (Fig. 16) of the gear 148 in such a manner that by an axial displacement of sleeve 256 the shaft 203 will be also displaced too. The sleeve 256 is provided on its outer circumference with a rack 254 with which meshes a spur gear 253 (Fig. 19) rigidly connected to a spur wheel 149 engaging a toothed flange 151 of a sleeve 259 rotatably mounted in the base 1. With the sleeve 259 hand lever 5 (Figs. 1 and 19) is rigidly connected. By a key 260 in the sleeve 259 the lever 5 rotates the valve piston 120. By turning the handle 5 (Fig. 19) the shaft 203 is moved in vertical direction and the lever 13 may be brought in or out of co-operation with the dogs 14 or 15 of table 3 and slide 4 respectively or into a neutral position. The gear 148 is of such a length that in either position the wheel 146 (Fig. 16) will remain in mesh with it.

As shown in Fig. 20 there is an automatic stop pin 233, engaging a notch 234 in the piston 121. The pin 233 stands under the action of a spring 232, which tends to keep the pin 233 in engagement with the notch 234. The pin 233 may be brought out of engagement by a knob 233¹ or by a lever 6, which is fast on a pinion 229 engaging a circular rack 230 of the stop pin 233.

The pinion 229 is fast on a shaft 227 on which the lever 6 is keyed. If piston 121 moves downwardly (Fig. 20) the tooth 233 is pushed back against the action of spring 232 until it springs into the recess 234. The piston 121 is held in its middle position and the lever 72 keeps the clutch members 191, 192 out of engagement. The shaft 80 is disconnected from the motor.

The grinding machine as described can be adapted to perform screw thread grinding as well as any plain cylindrical grinding and the grinding of radial planes on shouldered work and so on.

To perform the different operations the levers 5, 9 and the stops 14, 15 have to be set. To grind cylindrical faces by actuating simultaneously the table 3 by pressure fluid, the lever 5 is placed in the position A (Fig. 26) and the lever 13 is set at its lower position to co-operate with the dogs 15. The lever 9 is in the position denoted L (Fig. 1). The table 3 is automatically reciprocated. The shaft 80 with the work piece turns continuously in the same direction. The clutch 71 is not actuated and remains in its position, the shaft 80 is driven by the helical gears 141, 142 (Fig. 15) at a comparatively high speed.

Placing lever 5 into position B brings the automatic feed mechanism into "Zero" position. The lever 13 is in its neutral position and does not co-operate either with the dogs 14 or the dogs 15. The pressure fluid drive of table 3 is interrupted, and the table has to be moved by hand wheel 16. Placing lever 9 into position L the shaft 80 is driven continuously in the same direction. Placing lever 9 into position 0 (zero) the shaft 80 is out of gear with worm wheel 81 and helical gears 141, 142.

To grind screw threads or right handed or left handed screw threads by the automatic feeding of the grinding disc 50, the lever 5 is positioned at C. The lever 13 is thus placed to co-operate with the dogs 14 on the slide 4. The lever 9 is brought into the position G. The worm gear 81 is coupled with shaft 80 which runs therefore at low speed. At the same time the spur wheel 83 is brought in mesh with the spur wheel 84 and the lead spindle 102 is driven by the train of gears 220 to 224. If lever 13 is actuated by the dogs 14 the clutch 71, 72 is operated and the reversing of the drive is initiated. The slide 4 and therewith the work piece W may be removed quickly from the cross slide 42, by means of lever 8, which controls the valve 109 after the grinding disc 50 has disengaged the work piece.

To move the grinding disc 50 automatically to and from the work piece and to reciprocate the slide 4 the cam 90 is resorted to. The gear 91 is brought in engagement with the spur wheel 89 (Fig. 9) so that the cam 90 is now rotated. The reversal of the slide 4 is effected by the pin 136 on the cam and the gearing 137, 138, 139, 146 and 148.

To grind left handed screw threads the lever 5 is brought into the position D. The same operations are repeated as with lever 5 in position C with the exception that lever 13 works in opposite direction. With lever 5 in the position D only left handed screw threads are produced with the infeed of disc 50 by hand. By turning lever 5 from position "C" into position "D" the shaft 203 remains at rest and the sleeve 256 is moved only in vertical direction. By adjusting the throttling valve 11 the speed of the table 3 may be controlled. A quick return movement of the work piece W from the grinding disc 50 may be effected by turning lever 8 to the left (Fig. 1). The pressure liquid is led to the right of piston 111 (Fig. 2) the latter withdraws therefore the table 3 away from the grinding disc 50.

To grind screw threads on the workpiece the lever 9 is brought into position C (Fig. 1). The helical gears 141, 142 are brought out of engagement. The worm wheel 81 is now driven by the worm 202. By turning lever 9 into said position the gear 83 is brought in engagement with the gear 84. The latter drives by the gear train 220—226 the lead spindle 102 and advances the slide 4 while the table 3 remains at rest, abutting on the stop 113. This allows a correct positioning of the work piece with reference to the disc 50. The number of rotations of the workspindle 80 and its advance bear a fixed relation depending on the pitch of the screw threads to be produced and may be varied by changing the gears 220 to 224. The return movement of the slide 4 is initiated by turning the lever 13 by hand or by having the lever 13 turned by a dog 14, in such a manner that oil under pressure passes to the left side of piston 121 (Fig. 2). The piston 121 moving to the right reverses the clutch 71, 191, 192 by turning the lever 72 by means of its piston rod 250. At the same time the lever 56 is moved and transmitting its movements to the nut 49 it causes the shaft 54 to turn and to withdraw the cross-slide 42 and therewith the grinding disc from the work-piece W. At the end of the return stroke the lever 13 is turned again, but in opposite direction. The piston 121 moves backwards and the pin 233 enters the notch of piston 121. The latter is arrested and in this position of the piston 121 the clutch 71 is out of engagement with either clutch part 191, 192. The slide 4 and the shaft 80 are at rest. To start the work again the lever 6 has to be pressed down, whereby the pin 233 is withdrawn. The lever 13 is turned and the valve piston 120 moved. The pressure liquid moves the piston 121 and therewith the lever 72 to the right (Fig. 2). The clutch 71, 191, 192 is set again for the working stroke, the cross-slide 42 being fed by lever 56 and nut 49 towards the work piece W. The cross slide 42 is advanced towards the workpiece by turning the wheel 18. The wheel 18 is provided with an index playing over a dial. The gradation of the dial is preferably such that infeeds of .01 millimeter may be read-off easily. The cross-slide 42 is returned for about .5 millimeter to its initial position by the nut 49 which is operated by the piston 121 and lever 56, as explained.

To grind radial faces, for instance, the shoulder R (Fig. 21) the table 3 is positioned by the hand wheel 16 and rack 116. The lever 9 is set to bring the gears 141, 142 in driving engagement with the shaft 76. The cross-slide 42 is moved by the handwheel 18, a cup-shaped grinding tool being used to grind the face R. The table is preferably brought to bear against the adjustable stop 113 and by adjusting said stop 113 by the handwheel 17 a very fine feed may be given to the table 3 towards the grinding disc.

Of the various methods for producing screw threads by means of profiled grinding wheels, the use of multi-grooved grinding wheels is also known. A grinding disc is used provided with a number of grooves corresponding with the screw profiles to be produced on the workpiece. The grinding disc is selected of a width which is greater than the length of that part of the workpiece W, on which the screw thread is to be produced so that the axial movement necessitated by the pitch is given consideration.

With the grinding machine described the cross-feed of the grinding wheel to the depth of screw thread may be effected manually and after the grinding operation has taken place the grinding disc is also withdrawn from the workpiece by hand. Also the return of the workpiece into the initial position is effected by hand.

Now the machine enables screw threads to be produced in a more speedy manner, especially such screw threads which do not run out freely on both sides of the screw threaded portion of the workpiece W, but on one side abut against a shoulder R of the workpiece W. When grinding screw threads close to an abutting shoulder, it is extremely essential that also the last thread close to the shoulder R corresponds completely with the exact profile and diameter. It is very important at what speed the cross-feeding of the grinding disc occurs during the rotation of the workpiece W in relation to the circumferential speed of the workpiece W.

The rate of cross-feeding depends very considerably on the material to be treated. It is particularly important that the rate of cross-feeding can be maintained constant without being dependent on the skill of the operator attending to the machine.

These requirements are satisfied by making use of the cam 90 to control the infeed of the grinding disc 50 by operating the lever 56. The lever 56 rests on the periphery of the cam 90 by the tooth N, as described above. The periphery comprises two parts A and B. The gears driving the workpiece W and the cam 90 are calculated so that the workpiece W makes about two turns while the cam 90 makes one full turn. The cam 90 rotates in the direction indicated by the arrow I (Fig. 9).

The grinding disc 50, while the workpiece W rotates, is fed automatically to the necessary depth. The tooth N of the lever 56 rides on the portion A of the cam 90 (Fig. 23). The tooth N is forced outwardly and the lever 56 is turned accordingly. The lever 56 turns the nut 49 and the disc 50 is fed while the work-piece W turns about an angle equal to A' (Fig. 22), until the depth Y of the thread has been obtained. Then, during at least one complete revolution, the screw thread is completely ground cylindrically, the tooth N riding on the part B of the cam 90. The period of time of cross-feeding the grinding disc can be made smaller than, equal to or greater than one revolution of the workpiece. This depends on the ratio of the depth of the screw thread to the core diameter of the material to be treated and on the quality of the grinding disc and is a matter of experience in operation. After the grinding has been completed the grinding disc is withdrawn automatically from the ground screw thread, that is to say the grinding disc and the workpiece are separated from one another and at the same time the workpiece turns automatically backwards into the initial position. This is effected by the pin 136 which moves the valve piston 120 by the rod 137 and the gears 138, 146 as described above.

The piston 121 moves the piston rod 250 and therewith the lever 56 to the right (Fig. 9). The lever 56 is pressed against two stops 266 in the base 1 arranged on both sides of the pivot of lever 56. The latter rotates the nut 49 by link 57 and shifts the cross-slide 42 from the workpiece W.

By grinding screw threads in the manner described the lever 9 is set into position G, the lever 8 is turned to the right and lever 13 is turned to the right. There is pressure in the pipes 123, 124, 125, 129 and the pressure fluid flows back in the pipes 126, 127, 128, 130, 131 and 132.

When grinding coarser screw threads a number of revolutions of the workpiece are necessary. When the ends of the screw threads are free on both sides, that is if there is no shoulder on the workpiece close to the end of the screw threaded portion of the workpiece, the part of the cross-feeding can be suitably extended, provided that the grinding wheel is made sufficiently wide.

The adjustment of the depth of cut and the adjustment of the path of cross-feeding relatively to the duration of the rotation of the workpiece may be effected by mechanical or other control members known per se.

The machine of the present invention may be used for producing both external threads and internal threads as will be obvious from the above description.

Having thus described my invention, what I claim as new and desire to secure by Letters Patent is:

1. In a grinding machine, a base, a table slidably mounted on said base, a slide mounted on said table and adapted to be moved relatively thereto parallel to the direction of movement of said table, a headstock mounted on said slide, a work spindle rotatably mounted in said headstock, a prime mover including a change speed gearing mounted within said base for rotating a substantially vertical shaft adapted to be coupled with said work spindle for rotating the same, means for moving said slide and headstock thereon relatively to said table, a clutch in said headstock for selectively drivingly connecting said vertical shaft with said work spindle and said slide moving means respectively, manually operable means adapted to move said table, a cross slide mounted on said base movable at a right angle to the path of movement of said table and the slide thereon, a rotary grinding tool on a spindle and an independent power drive for said spindle mounted on said cross slide, a second manually operable means for moving said cross slide, and a fluid pressure mechanism adapted to move said table and said cross slide and to control the speed and direction of feed of said two members independently of their respective manually operable means.

2. In a grinding machine as claimed in claim 1, including within said change speed gearing a reversing clutch for reversing the rotation of said vertical shaft, means for operating said reversing clutch actuated by said fluid pressure mechanism, said means including a manually operable valve and adjustable dogs on said table and on said slide adapted to automatically operate said valve at the end of their respective feeding strokes.

3. In a grinding machine as claimed in claim 1, including within said change speed gearing a reversing clutch for reversing the rotation of said vertical shaft, means for operating said reversing clutch actuated by said fluid pressure mechanism, said means including a manually operable valve and adjustable dogs on said table and on said slide adapted to automatically operate said valve at the end of their respective feeding strokes, said valve being provided with a lever adapted to be moved selectively into the path of movement of the dogs on said table and said slide respectively, whereby either the movement of said table or said slide is automatically controlled.

4. In a grinding machine, a base, a table slidably mounted on said base, a slide mounted on said table and adapted to be moved relatively thereto parallel to the direction of movement of said table, a headstock mounted on said slide, a work spindle rotatably mounted in said headstock, a prime mover including a change speed gearing mounted within said base for rotating a substantially vertical shaft adapted to be coupled with said work spindle for rotating the same, said vertical shaft extending into said headstock, means for rotatably adjusting said headstock relatively to said slide about the axis of rotation of said vertical shaft, means for moving said slide and headstock thereon relatively to said table, a clutch in said headstock for selectively drivingly connecting said vertical shaft with said work spindle and said slide moving means respectively, manually operable means adapted to move said table, a cross slide mounted on said base movable at a right angle to the path of movement of said table and the slide thereon, a rotary grinding tool on a spindle and an independent power drive for said spindle mounted on said cross slide, a second manually operable means for moving said cross slide, and a fluid pressure mechanism adapted to move said table and said cross slide and to control the speed and direction of feed of said two members independently of their respective manually operable means.

5. In a grinding machine as claimed in claim 1, in which said fluid pressure mechanism including a manually and automatically operable valve provided with a selectively rotatable and axially movable piston, a cam controlling the movement of said cross slide and normally operatively connected with said change speed gearing, a fluid operated member adapted to disconnect said cam from said change speed gearing, a gearing connected with said piston and actuated by said cam after the cross slide has completed its feeding stroke for adjusting said piston and thereby causing said fluid operated member to become effective to disconnect said cam from said change speed gearing.

ALFRED RICKENMANN.